United States Patent
Salomon et al.

(10) Patent No.: US 11,418,417 B2
(45) Date of Patent: Aug. 16, 2022

(54) MANAGING STATEFUL WORKLOADS EXECUTING ON TEMPORARILY AVAILABLE RESOURCES OF A CLOUD COMPUTING SYSTEM

(71) Applicant: Red Hat, Inc., Raleigh, NC (US)

(72) Inventors: Yehoshua Salomon, Kfar Saba (IL); Orit Wasserman, Mitzpe Aviv (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/128,431

(22) Filed: Dec. 21, 2020

(65) Prior Publication Data
US 2022/0200879 A1    Jun. 23, 2022

(51) Int. Cl.
*H04L 43/0805*    (2022.01)
*H04L 67/1095*    (2022.01)
*H04L 43/06*    (2022.01)

(52) U.S. Cl.
CPC .......... *H04L 43/0805* (2013.01); *H04L 43/06* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 8,775,282 B1 * | 7/2014 | Ward, Jr. ............ | H04L 41/0896 705/34 |
| 10,289,453 B1 * | 5/2019 | Wei ..................... | H04L 67/10 |
| 10,810,043 B2 | 10/2020 | Bahramshahry et al. | |
| 2008/0112337 A1 * | 5/2008 | Shaffer .............. | H04L 12/1813 370/260 |

(Continued)

FOREIGN PATENT DOCUMENTS

| | | |
|---|---|---|
| CN | 103188345 B | 5/2016 |
| CN | 104572307 B | 3/2019 |

(Continued)

OTHER PUBLICATIONS

Bousselmi, K., et al., "QoS-Aware Scheduling of Workflows in Cloud Computing Environments," IEEE 30th International Conference on Advanced Information Networking and Applications, 2016, https://www.researchgate.net/publication/288000134_QoS-Aware_Scheduling_of_Workflows_in_Cloud_Computing_Environments.

*Primary Examiner* — Joshua Joo
(74) *Attorney, Agent, or Firm* — Kilpatrick Townsend & Stockton LLP

(57) ABSTRACT

Stateful workloads executing on temporarily available resources of a cloud computing system can be managed. For example, a computing device can receive, from a scheduled unit executing on a temporarily available resource of a compute node in a cloud computing system, a state measurement indicating a size of a state of the scheduled unit. The computing device can receive, from the compute node, a safe state capacity that is a size of data capable of being saved in response to the temporarily available resource being unavailable. The computing device can determine the state measurement for the scheduled unit exceeds the safe state capacity. In response to determining the state measurement exceeds the safe state capacity, the computing device can transmit a command to the scheduled unit to perform a state-reduction operation.

18 Claims, 4 Drawing Sheets

(56) References Cited

U.S. PATENT DOCUMENTS

| | | | | |
|---|---|---|---|---|
| 2013/0160011 A1* | 6/2013 | Corrie | ............... | G06F 9/45558 |
| | | | | 718/1 |
| 2014/0082612 A1* | 3/2014 | Breitgand | ............ | G06F 9/5005 |
| | | | | 718/1 |
| 2014/0173181 A1* | 6/2014 | Beveridge | ............ | G06F 9/5088 |
| | | | | 711/103 |
| 2015/0120674 A1* | 4/2015 | Lavoie | ............... | G06F 9/45533 |
| | | | | 707/679 |
| 2015/0172265 A1* | 6/2015 | Adogla | .................. | H04L 63/08 |
| | | | | 726/4 |
| 2015/0234617 A1* | 8/2015 | Li | ........................ | G06F 3/0617 |
| | | | | 711/114 |
| 2018/0074748 A1* | 3/2018 | Makin | .................. | G06F 3/0604 |
| 2018/0276009 A1* | 9/2018 | Williams | ............ | G06F 9/44526 |
| 2019/0141721 A1* | 5/2019 | Krishna | ................. | H04L 47/24 |
| 2019/0171472 A1* | 6/2019 | Wyble | ................ | G06F 9/45558 |
| 2021/0004257 A1* | 1/2021 | Sancheti | ............... | G06F 16/183 |

FOREIGN PATENT DOCUMENTS

| | | |
|---|---|---|
| CN | 106776005 B | 12/2019 |
| CN | 111290834 A | 6/2020 |
| CN | 111309440 A | 6/2020 |

\* cited by examiner

MANAGING STATEFUL WORKLOADS EXECUTING ON TEMPORARILY AVAILABLE RESOURCES OF A CLOUD COMPUTING SYSTEM

TECHNICAL FIELD

The present disclosure relates generally to cloud computing systems. More specifically, but not by way of limitation, this disclosure relates to managing stateful workloads executing on temporarily available resources of a cloud computing system.

BACKGROUND

Cloud computing systems provide compute resources to users on demand over a network. Cloud providers can provide the resources to users at varying service levels. One service level can include using spare resources of the cloud computing system. Other service levels can include permanent access to resources or access to resources of a higher quality.

DETAILED DESCRIPTION

Figure 1:
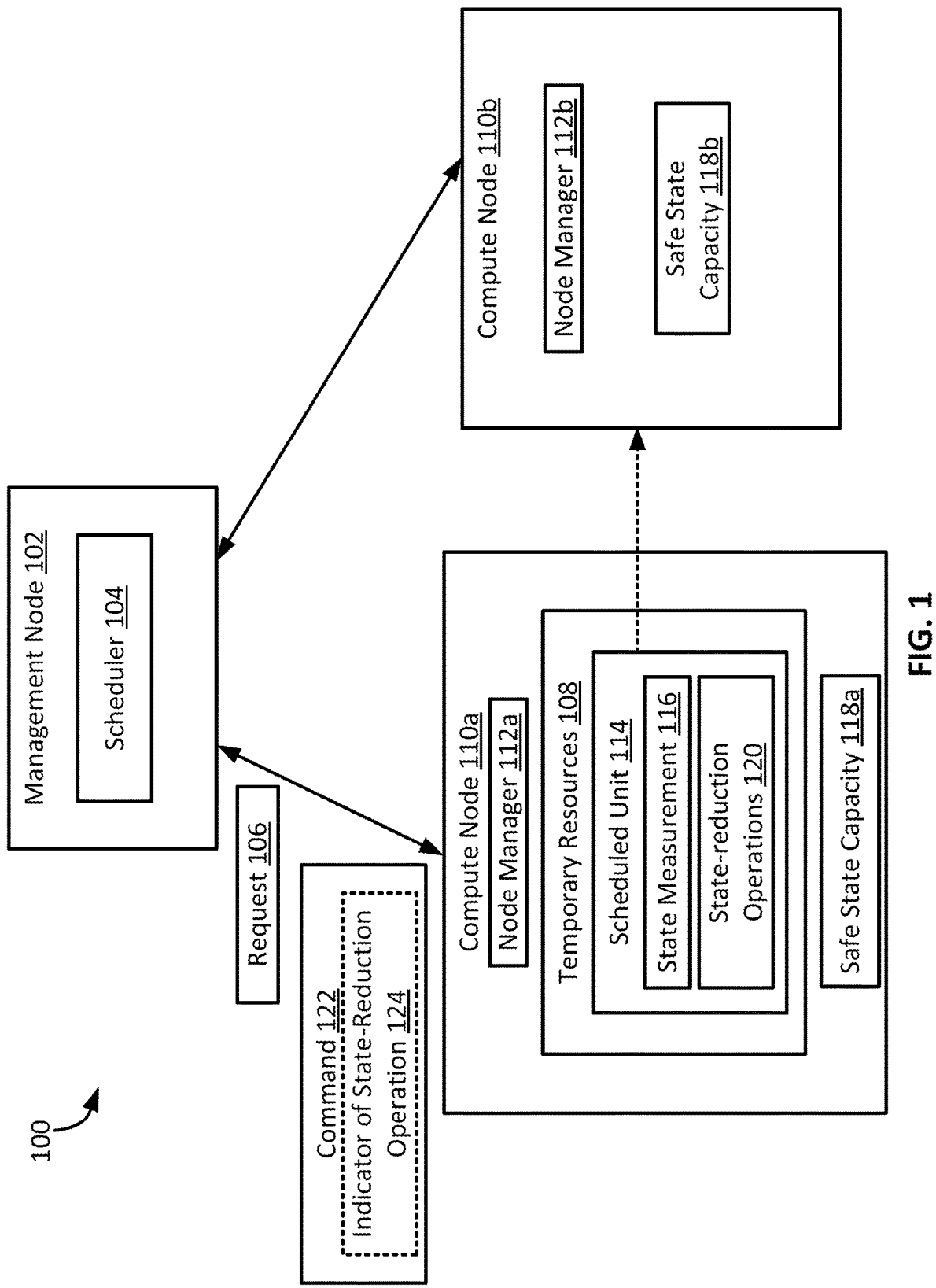
FIG. 1 is a block diagram of an example of a cloud computing system implementing stateful-workload management according to some aspects of the present disclosure.

In a cloud computing system, workloads can be executed on compute nodes. Stateless workloads do not preserve data, so the stateless workloads can be executed on temporarily available resources without risk of losing data if the resources become unavailable. Alternatively, stateful workloads preserve data that is at risk of being lost when the temporarily available resources become unavailable. The cloud computing system may not be able to consistently save the data of stateful workloads before the temporarily available resources are revoked. Therefore, cloud computing systems may limit the workloads users can execute on the temporarily available resources to stateless workloads so that data is not lost. As a result, users may not be able to take full advantage of the compute resources and execute stateful workloads safely on the temporarily available resources without risk of losing data.

Some examples of the present disclosure can overcome one or more of the abovementioned problems by managing stateful workloads executing on temporarily available resources of a cloud computing system to ensure data is preserved if the temporarily available resources become unavailable. A scheduler executing on a management node of the cloud computing system can receive a state measurement from a scheduled unit, such as a process, virtual machine, container, or pod, executing on a temporarily available resource of a compute node of the cloud computing system. The state measurement can indicate a size of state of the scheduled unit. The scheduler can also receive a safe state capacity for the compute node. The safe state capacity can be a size of data capable of being saved within a predefined time length after a request for the temporarily available resource is received by the scheduler. For example, the predefined time length can be two minutes. The scheduler can determine that the state measurement exceeds the safe state capacity, which indicates the size of the state may not be capable of being saved within the predefined time limit of the temporarily available resources becoming unavailable. The scheduler can transmit a command to the scheduled unit to perform a state-reduction operation. Examples of the state-reduction operation can include an upload of at least a portion of the state, a compaction of at least a portion of the state, a compression of at least a portion of the state, or a combination thereof. The state-reduction operation indicated in the command can be based on state-reduction operations the scheduled unit is capable of performing.

One particular example can involve a container executing on a compute node. A scheduler on the management node can receive a state measurement from the container. The state measurement can indicate that the size of state of the container will take three minutes to save outside of the compute node. The scheduler can also receive a safe state capacity for the compute node. The safe state capacity for the compute node can be a size of data capable of being saved outside of the compute node in less than two minutes. The scheduler can determine the state measurement exceeds the safe state capacity, and therefore the container should reduce its size of state. The scheduler can send a command for the container to compress its size of state to a size capable of being saved in less than two minutes. As a result, users can execute stateful workloads on temporarily available resources safely without risk of losing data when the temporarily available resources become unavailable.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a cloud computing system 100 according to some aspects of the present disclosure. The cloud computing system 100 includes compute nodes 110a-b. Examples of the compute nodes 110a-b include physical servers, virtual machines, and public cloud instances. The compute nodes 110a-b may include node managers 112a-b that are software applications or pods determining properties of the compute nodes 110a-b. The compute nodes 110a-b can execute scheduled units, such as scheduled unit 114 on compute node 110a. The scheduled unit 114 can be a workload, such as a virtual machine, a container, a pod, etc. The scheduled unit 114 can be executed on temporary resources 108. Examples of the temporary resources 108 can include memory, storage, CPU, etc. The temporary resources 108 can be spare resources of the cloud computing system 100 that may become unavailable at a later point in time. For example, the cloud computing system 100 may have multiple service levels for providing users access to resources. Lower level services may cost less than higher level services. For instance, using the temporary resources 108 may cost less than a service level that provides permanent access to resources. The temporary resources 108 can become unavailable to a user of the lower level service if a user with access to a higher service level requests the resources. Although multiple temporary resources are shown, any number, including one temporary resource, can be used.

In some examples, a scheduler 104 on a management node 102 can determine which scheduled units can safely run on each of the compute nodes 110a-b. To do so, the scheduler 104 can transmit a request 106 to the compute node 110a for a state measurement 116 of the scheduled unit 114. The scheduler 104 may send the request 106 each time the compute node 110a is to determine and send the state measurement 116, or the request 106 can indicate an interval at which the compute node 110a is to transmit the state measurement 116 to the scheduler 104. The state measurement 116 can include a size of state of the scheduled unit 114. The scheduled unit 114 can be stateful, and therefore have a state measurement 116 greater than zero. The size of state may be expressed as a length of time to write data of the scheduled unit 114 to a persistent or external source to the compute node 110a. For example, the size data can be written to a source that is not using the temporary resources 108. The node manager 112a can determine the state measurement 116 of the scheduled unit 114 and transmit the state measurement 116 to the scheduler 104.

The state measurement 116 may include a maximum change rate along with the size of state. The maximum change rate may be usable in predicting the state measurement 116 at a subsequent point in time. For example, the state measurement 116 can indicate the current size of state will take one hundred ten seconds to be written outside of the compute node 110a and that the maximum change rate for the scheduled unit 114 is a size of state that will take twenty seconds to be written outside of the compute node 110a. Therefore, the state measurement 116 at the subsequent point in time can be predicted to be one hundred thirty seconds.

In some examples, the scheduler 104 can additionally receive a safe state capacity 118a-b for the compute nodes 110a-b. The safe state capacity 118a-b can be a size of data capable of being saved outside of the compute nodes 110a-b when the temporary resources are to become unavailable. The cloud computing system 100 has a predefined time length between when the temporary resources 108 in the cloud computing system 100 are requested by another system and when the temporary resources 108 become unavailable for the cloud computing system 100. The compute node 110a can receive a notification indicating the temporary resources 108 are to be revoked after the predefined time length. For example, the predefined time may be two minutes, and the safe state capacity 118a may be a size of data capable of being saved outside of the compute node 110a in less than two minutes when the temporary resources 108 are requested. The safe state capacities 118a-b for the compute nodes 110a-b may be static values or dynamic values.

In some examples, the scheduler 104 can determine whether the scheduled units are in a safe state based on their state measurement and the safe state capacity of the compute nodes 110a-b. Scheduled units can be in a safe state when the state measurement is less than the safe state capacity. For example, the scheduler 104 can determine scheduled unit 114 is in a safe state if the state measurement 116 is less than the safe state capacity 118a. As one particular example, the state measurement 116 for the scheduled unit 114 can be a size of data that can be written outside of the compute node 110a in one hundred thirty seconds and the safe state capacity 118a for the compute node 110a can be one hundred twenty seconds. As a result, the scheduler 104 can determine the scheduled unit 114 is not in a safe state.

The scheduler 104 may additionally determine whether a scheduled unit is in a safe state based on the state measurement and the maximum change rate for the scheduled unit. The scheduled unit 114 can be in a safe state if a sum of the state measurement 116 and the maximum change rate is less than the safe state capacity 118a. For example, the state measurement 116 of the scheduled unit 114 can be a size of data that can be written outside the compute node 110a in one hundred ten seconds and a maximum change rate of a size of data that can be written outside of the compute node 110 in twenty seconds. The safe state capacity 118a for the compute node 110a can be one hundred twenty seconds. Therefore, the scheduler 104 can determine the scheduled unit 114 is not in a safe state since the sum of the state measurement 116 and the maximum change rate is one hundred thirty seconds, which exceeds the safe state capacity 118a.

In some examples, the scheduler 104 can transmit a command 122 to the scheduled unit 114 to perform a state-reduction operation based on the state measurement 116 exceeding the safe state capacity 118a. The state-reduction operation can be an operation the scheduled unit 114 can perform to decrease the state measurement 116 to a safe size. Examples of state-reduction operations can include an upload of at least a portion of the state, a compaction of at least a portion of the state, a compression of at least a portion of the state, or a combination thereof. The command 122 can include an indicator of the state-reduction operation 124 that is to be performed by the scheduled unit 114.

Scheduled units may vary in the state-reduction operations they are able to perform. Therefore, each scheduled unit can indicate to the scheduler 104 which state-reduction operations they are able to perform. For example, the scheduled unit 114 may be capable of performing state-reduction operations 120. The scheduler 104 can receive an indication of the state-reduction operations 120 the scheduled unit 114 is capable of performing at the same time the scheduler 104 receives the state measurement 116 or at a different time. The scheduler 104 can include a state-reduction operation from among the state-reduction operations 120 in the command 122.

The scheduler 104 can determine which state-reduction operation to include in the command 122 based on an amount of state that each of the state-reduction operations 120 are capable of reducing. For example, the scheduler 104 can determine the state measurement 116 should be reduced by ten seconds to be a safe state and that compressing the state can reduce the state measurement 116 by fifteen seconds. As a result, the indicator of the state-reduction operation 124 can include compressing the state.

In some examples, the scheduled unit 114 can perform the state-reduction operation indicated in the command 122 in response to receiving the command 122. The scheduler 104 may then receive a subsequent state measurement from the scheduled unit 114 indicating the size of state of the scheduled unit 114. The scheduler 104 can determine whether additional state-reduction operations should be performed for the scheduled unit 114 to be in a safe state.

In some examples, the subsequent state measurement may still exceed the safe state capacity 118a. The scheduler 104 may determine that the state-reduction operations 120 that the scheduled unit 114 is capable of performing are not sufficient to reduce enough state for the scheduled unit 114 to enter a safe state. As a result, the scheduler 104 can migrate the scheduled unit 114 to another compute node in the cloud computing system 100. For example, the scheduler 104 can determine the subsequent state measurement, which may include a maximum change rate, is less than the safe state capacity 118*b* of the compute node 110*b*, and migrate the scheduled unit 114 to the compute node 110*b*. In another example, the scheduler 104 can migrate a portion of the scheduled unit 114 outside of the compute node 110*a*, for example to compute node 110*b*.

It will be appreciated that FIG. 1 is intended to be illustrative and non-limiting. Other examples may include more components, fewer components, different components, or a different arrangement of the components shown in FIG. 1. For instance, although the cloud computing system 100 includes two compute nodes in the example of FIG. 1, the cloud computing system 100 may have hundreds or thousands of compute nodes in other examples.

Figure 2:
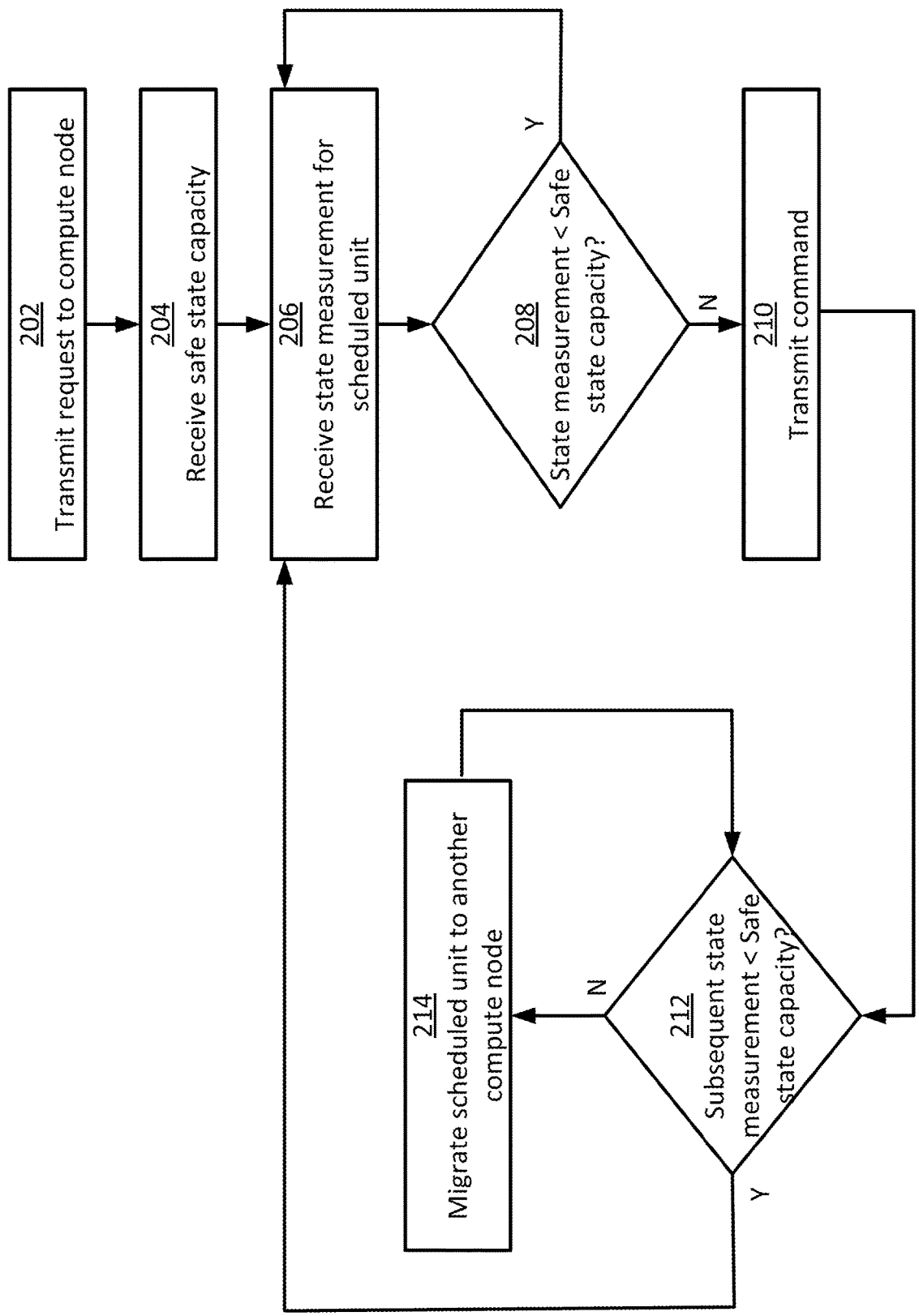
FIG. 2 is a flow chart of an example of a process for managing stateful workloads in a cloud computing system according to some aspects of the present disclosure.

FIG. 2 is a flow chart of an example of a process for managing stateful workloads in a cloud computing system according to some aspects of the present disclosure. Other examples can include more steps, fewer steps, different steps, or a different order of the steps than is shown in FIG. 2. The steps can be performed by a scheduler of a management node, such as the scheduler 104 of management node 102 in FIG. 1.

In block 202, the scheduler can transmit a request to a compute node. The request can be a request for a state measurement of a size of state of one or more scheduled units executing on the compute node. The one or more scheduled units can be executing on temporary resources of the compute node. Additionally, the request can be a request for a safe state capacity for the compute node.

In block 204, the scheduler can receive the safe state capacity from the compute node. A node manager of the compute node can determine the safe state capacity and transmit the safe state capacity to the scheduler. The safe state capacity may be a size of data capable of being saved outside of the compute node when the temporary resources become unavailable.

In block 206, the scheduler can receive the state measurement of the one or more scheduled units. For example, the state measurement for a scheduled unit can be a size of data of the scheduled unit. The scheduler may receive the state measurement as an amount of time to save the data outside the compute node. The state measurement may additionally include a maximum change rate usable in determining a predicted size of state for the scheduled unit at a subsequent time.

In block 208, the scheduler can determine whether the state measurement is less than the safe state capacity. The state measurement being less than the safe state capacity can indicate the scheduled unit is in a safe state. If the scheduler determines the state measurement is less than the safe state capacity, the scheduler can return to block 206 and receive additional state measurements for the one or more scheduled units. Otherwise, the scheduler can proceed to block 210.

In block 210, the scheduler can transmit a command to the one or more scheduled units. The command can indicate state-reduction operations to be performed by some or all of the one or more scheduled units. For example, the command can indicate a scheduled unit should compress some or all of the state of the scheduled unit to decrease the size of the state.

In block 212, the scheduler can determine whether a subsequent state measurement of the one or more scheduled units is less than the safe state capacity. The scheduler can receive the subsequent state measurement for the one or more scheduled units and compare the subsequent state measurement to the safe state capacity. If the subsequent state measurement is less than the safe state capacity for the compute node, the scheduler can return to block 206. Otherwise, the scheduler can proceed to block 214.

In block 214, the scheduler can migrate some or all of the one or more scheduled units to another compute node. The migrated scheduled units may all be migrated to the same compute node or different compute nodes. The scheduler can determine which compute node(s) the scheduled units can be migrated to based on receiving a safe state capacity for each of the other compute nodes in the cloud computing system. The scheduler can return to block 212 after migrating the scheduled units.

Figure 3:
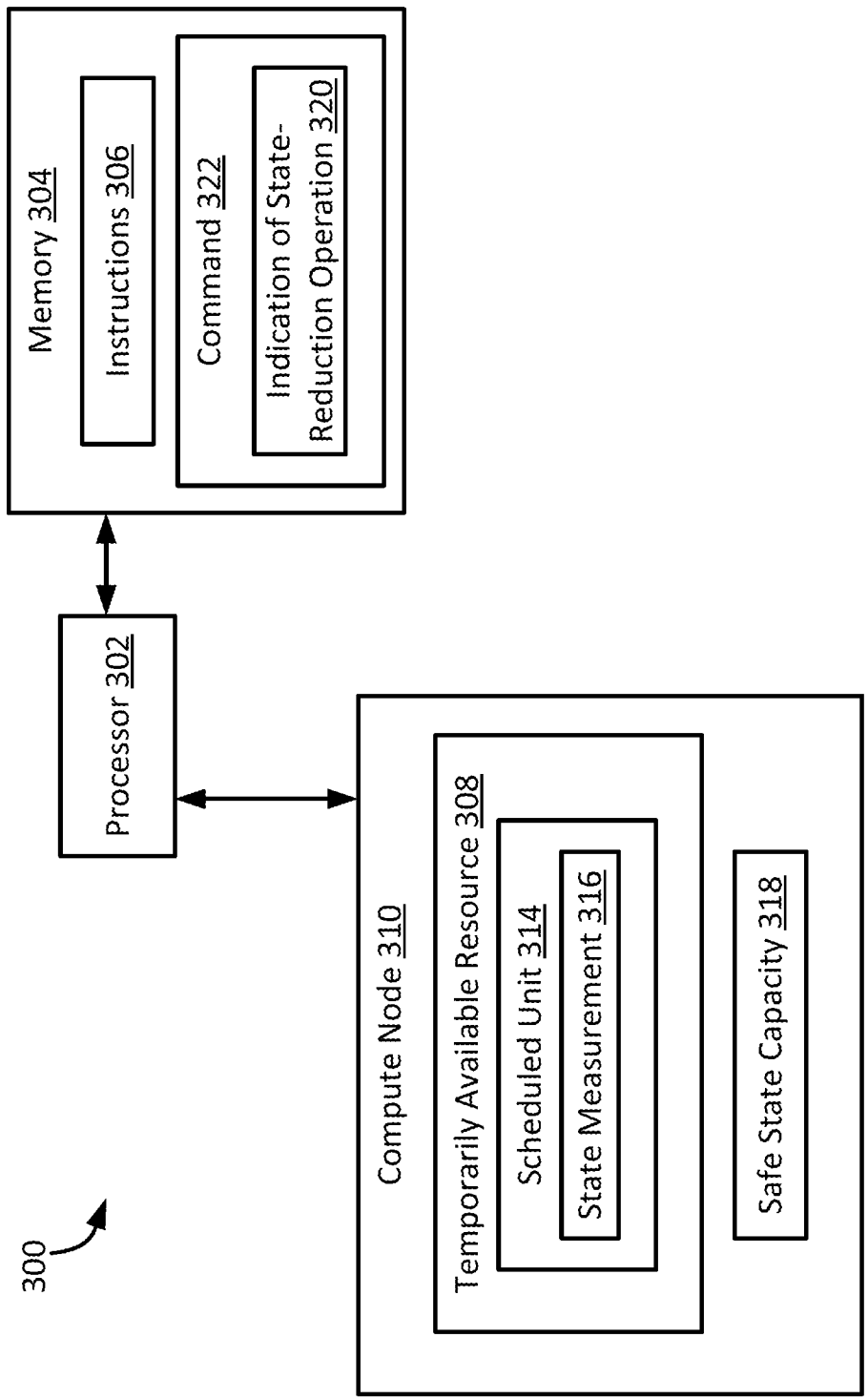
FIG. 3 is a block diagram of another example of a cloud computing system implementing stateful-workload management according to some aspects of the present disclosure.

FIG. 3 is a block diagram of another example of a cloud computing system 300 according to some aspects of the present disclosure. The cloud computing system 300 includes a compute node 310 and a processor 302. The processor 302 may be part of a management node, such as the management node 102 in FIG. 1.

In this example, the processor 302 is communicatively coupled with a memory 304. The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. The instructions 306 can include processor-specific instructions generated by a compiler or an interpreter from code written in any suitable computer-programming language, such as C, C++, C#, etc.

The memory 304 can include one memory or multiple memories. Non-limiting examples of the memory 304 can include electrically erasable and programmable read-only memory (EEPROM), flash memory, or any other type of non-volatile memory. At least some of the memory 304 includes a non-transitory computer-readable medium from which the processor 302 can read the instructions 306. The non-transitory computer-readable medium can include electronic, optical, magnetic, or other storage devices capable of providing the processor 302 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 306.

In some examples, the processor 302 can execute the instructions 306 to perform operations. For example, the processor 302 can receive, from a scheduled unit 314 executing on a temporarily available resource 308 of a compute node 310 in the cloud computing system 300, a state measurement 316 indicating a size of a state of the scheduled unit 314. The scheduled unit 314 can be stateful, and therefore have a state measurement 316 greater than zero. The processor 302 can receive, from the compute node 310, a safe state capacity 318 that is a size of data capable of being saved in response to the temporarily available resource 308 of the compute node 310 being unavailable. The processor 302 can determine the state measurement 316 for the scheduled unit 314 exceeds the safe state capacity 318. In response to determining the state measurement 316 exceeds the safe state capacity, the processor 302 can transmit a command 322 to the scheduled unit 314 to perform a state-reduction operation 320. The state-reduction operation 320 can be a state-reduction operation the scheduled unit 314 is capable of performing to decrease the size of the state of the scheduled unit 314.

Figure 4:
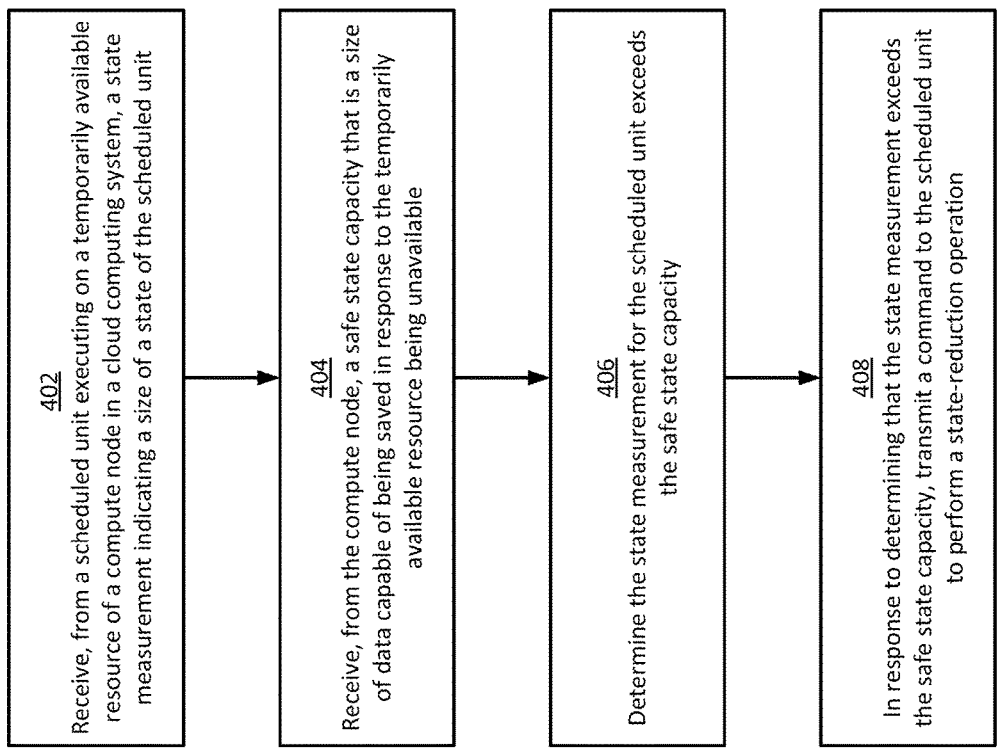
FIG. 4 is a flow chart of another example of a process for managing stateful workloads in a cloud computing system according to some aspects of the present disclosure.

In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, the processor 302 can receive, from a scheduled unit 314 executing on a temporarily available resource 308 of a compute node 310 in a cloud computing system 300, a state measurement 316 indicating a size of a state of the scheduled unit 314. The temporarily available resource 308 may become unavailable when a user requests the temporarily available resource 308.

In block 404, the processor 302 can receive, from the compute node 310, a safe state capacity 318 that is a size of data capable of being saved in response to the temporarily available resource 308 of the compute node 310 being unavailable. There may be a predefined time length between receiving the request for the temporarily available resource 308 and the temporarily available resource 308 being unavailable. Thus, the safe state capacity 318 can be a size of data capable of being saved within the predefined time length.

In block 406, the processor 302 can determine the state measurement 316 for the scheduled unit 314 exceeds the safe state capacity 318. The processor 302 can compare the state measurement 316 to the safe state capacity 318 to determine the state measurement 316 is larger. Additionally, the state measurement 316 may include a maximum change rate for the size of the state. The processor 302 can sum the size of state and the maximum change rate and determine that the summation exceeds the safe state capacity 318.

In block 408, the processor 302 can, in response to determining the state measurement 316 exceeds the safe state capacity 318, transmit a command 322 to the scheduled unit 314 to perform a state-reduction operation 320. The command 322 can determine a state-reduction operation 320 from a list of state-reduction operations the scheduled unit 314 is capable of performing. The state-reduction operation 320 can include compacting the state, compressing the state, uploading the state, a combination thereof, or any other suitable operation for decreasing the size of the state. This may aid in allowing compute nodes with temporarily available resources to safely execute stateful workloads.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory including instructions that are executable by the processor for causing the processor to:
receive, from a scheduled unit executing on a temporarily available resource of a compute node in a cloud computing system, a state measurement indicating a size of a state of the scheduled unit and a maximum change rate for the size of the state, wherein the temporarily available resource is configured to be unavailable beginning at a predefined time length subsequent to receiving a notification indicating the temporarily available resource is to be revoked;
receive, from the compute node, a safe state capacity that is a size of data capable of being saved within the predefined time length in response to the temporarily available resource being unavailable based on a request for the temporarily available resource from a different user having a higher service level than a user currently using the temporarily available resource;
determine the state measurement for the scheduled unit exceeds the safe state capacity; and
in response to determining that the state measurement exceeds the safe state capacity, transmit a command to the scheduled unit to perform a state-reduction operation.

2. The system of claim 1, wherein the memory further includes instructions that are executable by the processor for causing the processor to receive, from the scheduled unit, a plurality of state-reduction operations the scheduled unit is capable of performing, wherein the state-reduction operation indicated in the command is among the plurality of state-reduction operations.

3. The system of claim 1, wherein the memory further includes instructions that are executable by the processor for causing the processor to:
receive, from the scheduled unit, a subsequent state measurement indicating the size of the state of the scheduled unit;
determine the subsequent state measurement exceeds the safe state capacity; and
migrate the scheduled unit to another compute node in the cloud computing system.

4. The system of claim 1, wherein the memory further includes instructions that are executable by the processor for causing the processor to determine a predicted size of state for the scheduled unit at a subsequent time based on the size of the state and the maximum change rate for the size of the state.

5. The system of claim 1, wherein the state-reduction operation comprises an upload of at least a portion of the state, a compaction of at least a portion of the state, a compression of at least a portion of the state, or a combination thereof.

6. The system of claim 1, wherein the size of the state for the scheduled unit is greater than zero.

7. The system of claim 1, wherein the memory further includes instructions that are executable by the processor for causing the processor to, prior to receiving the state measurement, transmit a request for the state measurement to the scheduled unit.

8. The system of claim 1, wherein the size of the state for the scheduled unit is a length of time to store the state in a persistent or external source to the compute node.

9. A computer-implemented method comprising:
receiving, from a scheduled unit executing on a temporarily available resource of a compute node in a cloud computing system, a state measurement indicating a size of a state of the scheduled unit and a maximum change rate for the size of the state, wherein the temporarily available resource is unavailable beginning at a predefined time length subsequent to receiving a notification indicating the temporarily available resource is to be revoked;
receiving, from the compute node, a safe state capacity that is a size of data capable of being saved within the predefined time length in response to the temporarily available resource being unavailable based on a request for the temporarily available resource from a different user having a higher service level than a user currently using the temporarily available resource;

determining the state measurement for the scheduled unit exceeds the safe state capacity; and in response to determining the state measurement exceeds the safe state capacity, transmitting a command to the scheduled unit to perform a state-reduction operation.

10. The method of claim 9, further comprising receiving, from the scheduled unit, a plurality of state-reduction operations the scheduled unit is capable of performing, wherein the state-reduction operation indicated in the command is among the plurality of state-reduction operations.

11. The method of claim 9, further comprising:

receiving, from the scheduled unit, a subsequent state measurement indicating the size of the state of the scheduled unit;

determining the subsequent state measurement exceeds the safe state capacity; and migrating the scheduled unit to another compute node in the cloud computing system.

12. The method of claim 9, further comprising determining a predicted size of state for the scheduled unit at a subsequent time based on the size of the state and the maximum change rate for the size of the state.

13. The method of claim 9, wherein the state-reduction operation comprises an upload of at least a portion of the state, a compaction of at least a portion of the state, a compression of at least a portion of the state, or a combination thereof.

14. The method of claim 9, wherein the size of the state for the scheduled unit is greater than zero.

15. The method of claim 9, further comprising, prior to receiving the state measurement, transmitting a request for the state measurement to the scheduled unit.

16. The method of claim 9, wherein the size of the state for the scheduled unit is a length of time to store the state in a persistent or external source to the compute node.

17. A non-transitory computer-readable medium comprising program code that is executable by a processor for causing the processor to:

receive, from a scheduled unit executing on a temporarily available resource of a compute node in a cloud computing system, a state measurement indicating a size of a state of the scheduled unit and a maximum change rate for the size of the state, wherein the temporarily available resource is configured to be unavailable beginning at a predefined time length subsequent to receiving a notification indicating the temporarily available resource is to be revoked;

receive, from the compute node, a safe state capacity that is a size of data capable of being saved within the predefined time length in response to the temporarily available resource being unavailable based on a request for the temporarily available resource from a different user having a higher service level than a user currently using the temporarily available resource;

determine the state measurement for the scheduled unit exceeds the safe state capacity; and in response to determining the state measurement exceeds the safe state capacity, transmit a command to the scheduled unit to perform a state-reduction operation.

18. The non-transitory computer-readable medium of claim 17, further comprising program code that is executable by the processor for causing the processor to receive, from the scheduled unit, a plurality of state-reduction operations the scheduled unit is capable of performing, wherein the state-reduction operation indicated in the command is among the plurality of state-reduction operations.

* * * * *